United States Patent
Quentin

(10) Patent No.: US 11,182,765 B2
(45) Date of Patent: Nov. 23, 2021

(54) METHOD FOR PROCESSING A RECURRING TRANSACTION, CORRESPONDING DEVICE AND PROGRAM

(71) Applicant: INGENICO GROUP, Paris (FR)

(72) Inventor: Pierre Quentin, Enghien-les-Bains (FR)

(73) Assignee: INGENICO GROUP, Paris (FR)

(*) Notice: Subject to any disclaimer, the term of this patent is extended or adjusted under 35 U.S.C. 154(b) by 525 days.

(21) Appl. No.: 15/505,652

(22) PCT Filed: Sep. 2, 2015

(86) PCT No.: PCT/EP2015/070056
§ 371 (c)(1),
(2) Date: Feb. 22, 2017

(87) PCT Pub. No.: WO2016/034627
PCT Pub. Date: Mar. 10, 2016

(65) Prior Publication Data
US 2017/0249620 A1    Aug. 31, 2017

(30) Foreign Application Priority Data
Sep. 2, 2014    (FR) .................................... 1458208

(51) Int. Cl.
*G06Q 20/22*    (2012.01)
*G06Q 20/40*    (2012.01)
(Continued)

(52) U.S. Cl.
CPC ............. *G06Q 20/22* (2013.01); *G06Q 20/10* (2013.01); *G06Q 20/34* (2013.01); *G06Q 20/405* (2013.01)

(58) Field of Classification Search
CPC .................................................... G06Q 20/405
(Continued)

(56) References Cited

U.S. PATENT DOCUMENTS 10,552,917 B1* 2/2020 Kunz ............... G06Q 40/12
2008/0249931 A1* 10/2008 Gilder ............... G06Q 20/04
705/39

(Continued)

FOREIGN PATENT DOCUMENTS

WO    0241224 A1    5/2002

*Primary Examiner* — Scott C Anderson
*Assistant Examiner* — Matthew Cobb
(74) *Attorney, Agent, or Firm* — Benoit & Côté Inc.

(57) ABSTRACT

The invention relates to a method for processing a recurring transaction for access to a good or to a service by a transactional processing device (DTT), the method comprising an initial step for obtaining a piece of data representing a processing instruction (iTrR) for processing a recurring transaction (TrR), the method being characterized in that it comprises:
- a step (100) for transmitting a message (Msg) of interrogation of a given type, said message (Msg) comprising at least one piece of identification data (Id) for identifying said recurring transaction, to a terminal (TermU) of a user having previously taken out a subscription for said good or said service;
- a step (110) for inserting said recurring transaction into a deferred processing database (BT-TD);
- transactional processing (120), depending on the occurrence of at least one of the following events:
  - reception (130) of a message (Msg2) from said terminal (TermU) of said user;
  - expiry of the deadline for carrying out said recurring transaction (140).

6 Claims, 2 Drawing Sheets

Figure 1:
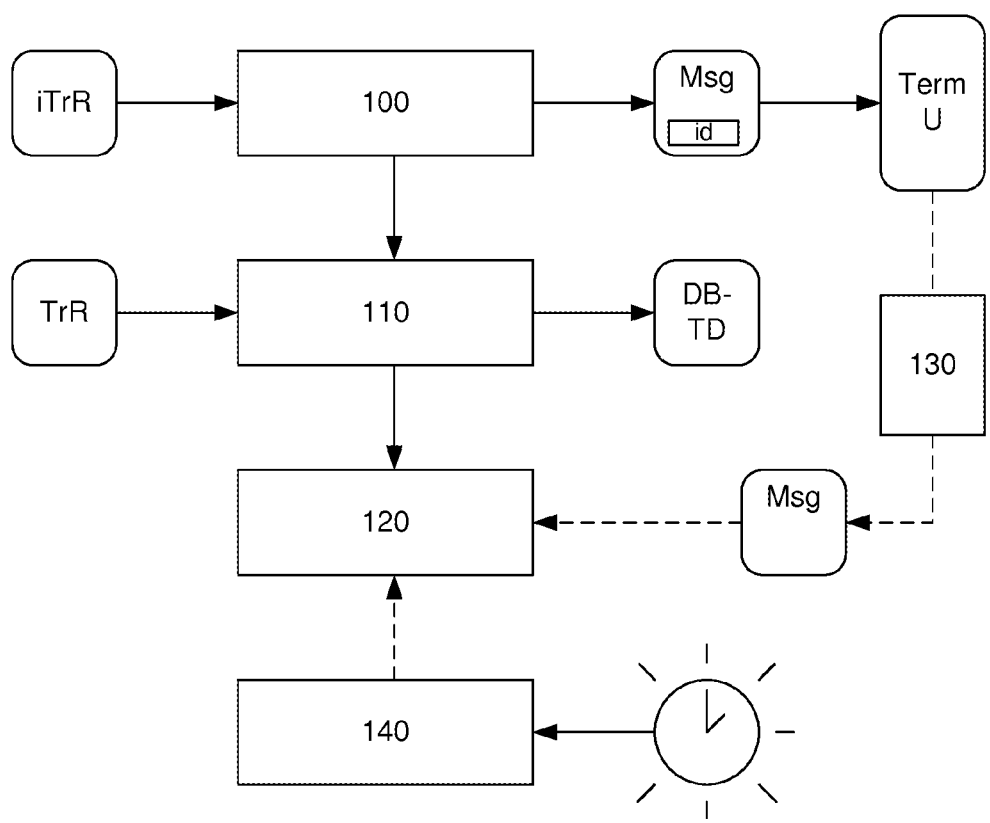

(51) Int. Cl.
*G06Q 20/10* (2012.01)
*G06Q 20/34* (2012.01)

(58) Field of Classification Search
USPC .......................................................... 705/39
See application file for complete search history.

(56) References Cited

U.S. PATENT DOCUMENTS

| | | |
|---|---|---|
| 2009/0171839 A1 | 7/2009 | Rosano et al. |
| 2012/0221468 A1* | 8/2012 | Kumnick ............... G06Q 20/40 705/44 |
| 2012/0276870 A1* | 11/2012 | Davis .................... G06Q 20/22 455/407 |
| 2013/0060679 A1 | 3/2013 | Oskolkov et al. |
| 2014/0114826 A1 | 4/2014 | Lopez et al. |
| 2017/0249620 A1* | 8/2017 | Quentin ................ G06Q 20/10 |

\* cited by examiner

METHOD FOR PROCESSING A RECURRING TRANSACTION, CORRESPONDING DEVICE AND PROGRAM

1. FIELD OF THE INVENTION

The invention relates to the processing of transactional data. The invention relates more particularly to the recurrent processing of transactional data. The invention relates more specifically to the recurrent processing of transactional data needed to carry out a payment.

2. PRIOR ART

For example, when a user wishes to subscribe to a paid service, the vendor or seller asks the user to state a mode of payment for this service. In the large majority of cases, the user who wishes to make a minimum number of operations directly gives the vendor bank data (this example avoids the necessity of his having to send a check in the post). This data chiefly takes the form of bankcard data (card number, holder's name, expiry date and visual cryptogram).

Thus, the vendor has the data needed to carry out the payment for his services. The problem, from the user's viewpoint, is then that of unsubscribing from these services: indeed, when the vendor has data that enable him to obtain payments, he is often disinclined to make it easy for his customer to unsubscribe from a service. The vendor's interest rather is to continue to obtain payment for his service and therefore not to make it easy for the user to unsubscribe. As a rule, in order to unsubscribe from a service, the user must contact the vendor by mail by a predetermined due date (for example three months before the renewal date) in order to express his wish to discontinue subscription to the service. Very often, the user forgets to do this and remains captive to the vendor until the bankcard expiry date. At this time, the vendor must necessarily ask the user again for his bankcard data.

This problem is less present when the user, instead of communicating his bankcard data, communicates, for example, what is known as SEPA (Single Euro Payment Area) data. Indeed, the payment is then processed differently: in a SEPA processing operation, the user can stop payment at any time by informing his payment service provider (for example his bank) that he is no longer authorizing any SEPA direct debit by the vendor. Although this is an easier practice, it nevertheless calls for writing to the bank establishment. Now, it often happens that the user spots the SEPA direct debit operation only after it has gone through his bank account. He therefore has to carry out the operation for striking off the vendor after the direct debit has been made.

From a general point of view, unsubscribing from subscribed services (whether free of charge or are paid for) is a problem. Owing to the growth in communication means, access to information has become so easy that the economic model of information has itself evolved. Within a few years, we have moved from a predominantly paying model (in which the user purchases a content through a physical medium such as a book or a newspaper) to a predominantly free or unpaid model (in which the user consumes information or data free of charge in exchange for advertisement profiling). This change of model or paradigm however has not modified the way in which the user (or customer) is perceived by the vendor: the customer continues to be a source of income, either directly or indirectly. It might have been imagined, on the contrary, that the growth in digital applications would have made things easier for the user: this is not at all the case. Whether a service is free of charge or paid for, unsubscribing from this service continues to be a major problem.

The method of the invention aims to facilitate this process of unsubscribing, by depriving the vendor of his source of income.

3. SUMMARY OF THE INVENTION

The invention does not raise at least some of the problems of the prior art. The invention relates to a method for processing a recurring transaction for access to a good or to a service by a transactional processing device, the method comprising an initial step for obtaining a piece of data representing a processing instruction for processing a recurring transaction.

According to the invention, such a method comprises:
 a step for transmitting a message of interrogation of a given type, said message comprising at least one piece of identification data for identifying said recurring transaction, to a terminal of a user having previously taken out a subscription for said good or said service;
 a step for inserting said recurring transaction into a deferred processing database;
 transactional processing, depending on the occurrence of at least one of the following events:
  reception of a message from said terminal of said user;
  expiry of the deadline for carrying out said recurring transaction.

According to one particular characteristic, said method comprises a step for computing a probable due date of said transaction as a function of a transactional profile of said user.

According to one particular characteristic, said method comprises a step for computing a probable due date for said transaction as a function of a transactional profile of a provider of said good or said service.

According to one particular characteristic, said type of said message transmitted to said terminal of said user is a message of tacit acceptance of said recurring transaction.

Thus, the user can be informed of the next transaction without however having to perform an action for this transaction to take place and thus continue the subscription to the good or service.

According to one particular characteristic, said type of said message transmitted to said terminal of said user is a message of tacit rejection of said recurring transaction.

Thus, the user can fully cancel his subscription to the good or to the service by not responding to the message that is transmitted to him.

According to one particular characteristic, said insertion into the deferred processing database comprises, in conjunction, the insertion of said type of said message and a deadline for implementing said transaction.

According to one particular embodiment, said recurring transaction is a financial transaction.

According to one particular embodiment, a prior subscription to said good or said service will have been performed online by using a bankcard.

According to another form, the invention also relates to a device for processing a recurring transaction for access to a good or to a service comprising means for obtaining a piece of data representing an instruction for processing a recurring transaction, the device being characterized in that it comprises:

means for transmitting a message of interrogation of a given type, said message comprising at least one piece of identification data for identifying said recurring transaction, to a terminal of a user who has previously taken out a subscription for said good or said service;

means for inserting said recurring transaction into a deferred processing database;

means of transactional processing as a function of the occurrence of at least one of the following events:
receiving a message coming from said terminal of said user;
the expiry of the deadline for carrying out said recurring transaction.

Such a device can take the form of a server or a terminal.

In another form, the invention also relates to a system for processing a recurring transaction for access to a good or a service comprising means for obtaining a piece of data representing an instruction for processing a recurring transaction, the system being characterized in that it comprises:

means for transmitting a message of interrogation of a given type, said message comprising at least one piece of identification data for identifying said recurring transaction, to a terminal of a user who has previously taken out a subscription for said good or said service;

means for inserting said recurring transaction into a deferred processing database;

means of transactional processing as a function of the occurrence of at least one of the following events:
receiving a message coming from said terminal of said user;
expiry of the deadline for carrying out said recurring transaction.

In such a system, the means used are distributed between a server and a terminal as described below.

According to a preferred implementation, the different steps of the methods according to the invention are implemented by one or more computer software programs comprising software instructions to be executed by a data processor of a relay module according to the invention and being designed to command the execution of the different steps of the method.

The invention is therefore also aimed at providing a computer program liable to be executed by a computer or else by a data processor, this program comprising instructions to command the execution of the steps of a method as mentioned here above.

This program can use any programming language whatsoever and can be in the form of source code, object code or a code that is intermediate between source code and object code, such as in a partially compiled form or in any other desirable form.

The invention is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive, an SSD etc<;.

Again, the information carrier can be a transmissible carrier such as an electrical or optical signal that can be conveyed via an electrical or optical cable, by radio or by other means. The program according to the invention can especially be uploaded to an Internet type network.

As an alternative, the information carrier can be an integrated circuit (of the ASIC or FPGA type) into which the program is incorporated, the circuit being adapted to executing or to being used in the execution of the method in question.

According to one embodiment, the invention is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router, etc) and is capable of accessing hardware resources of this physical entity (memories, recording carriers, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smart card, a memory card, an electronic board for the execution of firmware, etc.

4. DRAWINGS

Figure 2:
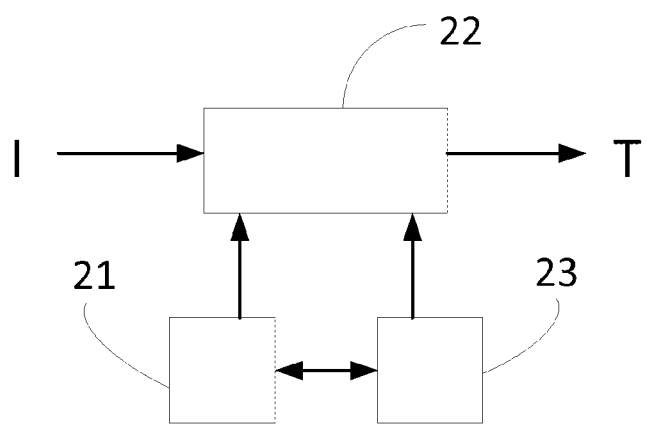

Other features and advantages of the proposed technique shall appear more clearly from the following description of a preferred embodiment, given by way of a simple illustratory and non-exhaustive example and from the appended drawings, of which:

FIG. 1 presents the main steps of the proposed techniques;

FIG. 2 schematically represents a server for implementing the method described above.

5. DESCRIPTION 5.1. Reminder of the Principle

As indicated above, within the context of subscriptions to goods or services, the payment for these goods or services is done regularly (for example every month, every quarter, etc.). Now, although the user has furnished his or her bank data to the vendor only once, the latter is in a position to continue with the direct debit operation without the user's explicit agreement, and can do so for a relatively lengthy period of time. Thus, when the subscription is taken out, three parties (at least) are involved: the user (the buyer), the vendor and the payment services provider (a bank or financial institution). Then, during the (more or less tacit) renewal of the subscription, only the vendor and the payment services provider are involved. The user, in a manner of speaking, no longer has any control over the direct debit operations made on his bank account. Besides, to fully understand the problem, we must also consider the fact that there is at least a one fourth actor who can also be involved. This is the payment services supplier (for example a private company, a technical supplier independent of the payment services provider) who is entrusted by the vendor with the effective implementing of the payment, which can make the situation even more opaque from the buyer's viewpoint. Technically, the user is therefore faced with a problem of the speed with which his decision is carried out in the face of recurring transactions that he no longer controls. Indeed, although the user knows that he can stop a recurring transaction (for example by cancelling a subscription), the vendor is reluctant to inform the user that he can do so and above all to inform him about the deadlines that allow the user to act sufficiently ahead (i.e. for example within the statutory deadlines).

The general principle of the invention therefore consists in setting up a link between the payment services provider and the user. This link is used to obtain an authorization (which may be explicit or tacit) to implement a service and therefore prompt payment for this service.

To this end, the inventors have proposed the requesting of authorization by the purchaser (the user) to carry out the recurring payment. This authorization is either tacit or explicit, depending on predetermined parameters. The link between the user and the payment services provider is created when the user enters the data needed for payment. Unlike in the presently used technique, the user is asked to enter, a piece of contact data (for example an email address or a telephone number) in addition to the bank data and, as the case may be, to enter data on the periodicity of the payments. (This periodicity can also be given by the vendor). The user can also be asked to indicate whether he wishes to make payment by default or reject payment by default (i.e. whether he wishes to make or reject payment without responding to the message sent to him), depending on the embodiments chosen.

The general principle of the technique described with reference to FIG. 1 comprises the following steps:
 when a recurring payment must be made (for example a quarterly payment for a magazine or journal), the payment services provider transmits (100) a message to the user (for example an email or SMS message). This message comprises the data needed to identify the payment to be made (beneficiary, amount, etc.);
 at the same time, the payment services provider places (110) this transaction on hold, for a predetermined duration (this duration can be staggered from a few hours to a few days).

This duration depends firstly on the speed with which the payment services provider is supposed to fulfill his obligation to make payment and secondly on possible payment in advance;
 transactional processing (120) according to the occurrence of at least one of the following two events:
 reception (130) of a message coming from the user;
 the expiry (140) of the deadline for making the transaction.

In one complementary embodiment, the advantage of which is to bring the user even closer to the payment services provider, the technique comprises a computation of the due date of renewal. Such a computation is done in order to anticipate the renewal and offer the user a deadline that is sufficiently extended to enable him to respond to the transmitted message. Indeed, depending on the vendor, the period of time between the instant when the instructions to make payment are sent and the instant when the payment must be effectively made can be very short. In such a case, it is probable that the user will not have the time to send instructions (this is why the vendors also act). In this case, on the basis of the data entered by the user during the first payment, the proposed technique computes due dates of payment and transmits a message to the user, prior to the reception of the vendor's instructions.

This computation can be done in several different ways. In a first variant, this computation is based on a periodicity given by the user (for example every quarter). In this case, the server anticipates this due date by a predetermined number of days (a number of days that may be selected by the user if necessary). In this variant, the due date is computed as a function of the transactional profile of the user with respect to this good or this service, at least some of the above-mentioned data constituting this transactional profile. In a second variant, this computation is based on similar or identical payments, coming from the vendor. This computation then comprises a step of identification, within a database, of transactions coming from the same vendor and of an identical amount in order to determine their periodicity and a step for applying an advance payment deadline to this pre-computed due date. In this variant, the due date is computed as a function of the transactional profile of the provider of goods or services.

There then follows a transmission to the user of the message of information. This message of information is transmitted at the pre-computed advance payment deadline.

At least two distinct embodiments of this method can be implemented. A first embodiment can be implemented in the context of the transactional payments known as SEPA payments. A second embodiment can be implemented in the context of transactional processing operations known as "card not present" payments (i.e. using an online bankcard payment type of transaction). This second embodiment shall be described below. The first embodiment is appreciably identical in processing terms except that it does not include the management of recurrences by the payment services provider: it is the vendor who manages the recurrence. In this second embodiment, the internal and anticipated management of the recurrence by the payment services provider is therefore an additional competitive advantage for the payment services provider.

Naturally, the technique described goes well beyond the processing of simple payments. It is rather part of a management of a relationship between a provider of goods and services (even free of charge) and a user, when the management of the subscription is entrusted to a third party.

5.2. Description of One Embodiment

In this embodiment, the payment services provider (for example the organization responsible for making the bankcard transaction on behalf of the bank establishments, the customers and the vendors) implements the method described here above by means of a transaction data-processing server (TDPS) taking account of pre-set contractual dates for payment made on the basis of bankcard data (this is not SEPA type processing).

In a first embodiment, this implementation enables the user (or paying client) to define a periodicity of payment when entering the bankcard data needed for payment. Such a definition of periodicity is variable: it depends chiefly on the terminal used to carry out the payment. In the case of payment by means of a terminal that links up to a web page of a payment service provider server, this definition can be implemented by using a scrolling list of definitions of periodicity (for example weekly, monthly, quarterly, yearly, etc.). In a second embodiment, this periodicity can also be part of the data given by the vendor. Indeed, barring a few exceptions, the vendor (online) is not the one that makes the payment operation. This operation is delegated to a payment services supplier even when the payment is repetitive and recurring. Two possibilities can thus be implemented: either the vendor manages the recurring payments alone and transmits a payment request to the transactional data payment server (TDPS) at each due date (monthly, quarterly, annual) and in this case the due date number is part of the information transmitted to the transactional data-processing server (TDPS); or the vendor delegates the management of the recurring payments to the payments services provider and the latter carries out the operations needed all by itself at each due date and in this case the transactional data-processing server (TDPS) knows the due date number. In knowing this number, the transactional data payment server (TDPS) is capable of requesting confirmation from the purchaser.

On the basis especially of this number, the transactional data-processing server (TDPS) performs the following operations:
- transmission (100), to a terminal of the purchase (TermU) of a message (Msg) informing the latter of the transaction to be made; as an accessory, this message can also contain the amount of the transaction and/or the beneficiary and/or the periodicity. The message is of two possible types: either it is a message of tacit acceptance or it is a message of tacit rejection. The type of message transmitted to the user is determined either by the user himself when he enters his bankcard data during a first payment or by the vendor when delegating payment to the transactional data-processing server.
- putting the transaction on hold (110); this operation of putting the transaction on hold is performed by inserting the current transaction (TrC) into a deferred processing database (BD-TD). This putting on hold is characterized especially by the addition, to the recording of the current transaction (CRC) in the database (BD-TD), of the type of message (TypM) transmitted and a deadline for responding to this message (DeadL).
- transactional processing (120) when at least one of the following events occurs:
  - reception (130) from a terminal of the user, of a response message;
  - exceeding (140) the deadline for responding to the message transmitted by the transactional data-processing server (TDPS).

The transactional processing can take two forms:
- in the first form a transaction is carried out according to the planned modalities; this first form is implemented at the reception of an explicit message of acceptance from the user or at the expiry of the deadline for responding to a tacit acceptance message coming from the transactional data-processing server (TDPS);
- in the second form, the transaction is not carried out; this second form is implemented at the reception of an explicit message of rejection from the user or at an expiry of the deadline for responding to a tacit rejection message coming from the transactional data payment server (TDPS).

The first form of transactional processing does not call for any particular observations. In addition to the usually implemented actions (debit/credit etc.), this first form of processing comprises a step for transmitting message to the user's terminal confirming the performance of the transaction (comprising the beneficiary or again the directly debited amount).

The second form of processing comprises several novel characteristics. On the one hand, the rejection of payment must be notified to the vendor. This notification of a rejection of payment consists of the transmission, to the vendor, of a message indicating that the user has rejected the direct debit operation. This message must make it possible to activate the actions needed on the part of the vendor, for example in order to cancel the subscription to the service. On the other hand, the rejection is recorded in a database of the transactional data-processing server (TDPS). This recording is then used to identify a new occurrence, if any, of the transaction.

Indeed it is possible, if not quite probable, that certain merchants will not really be satisfied with the possibility offered to the user of easily unsubscribing from their services by ceasing to accept scheduled payments. In this case, when it is the vendor who has the initiative for the recurring payment (i.e. when he has not delegated the recurring payment to the payment services provider but is calling upon the payment services provider to make payments on demand), it can be envisaged that the vendor, noting that a first payment has been rejected, will make a fresh attempt to obtain payment. In this case, the recording of the rejected payments in a database enables verification, prior to the transmission of the message for payment to the customer, that the payment has not been rejected. This makes it possible not to unnecessarily require action by the customer and therefore to provide him with a better user experience.

In one specific embodiment, the user's terminal is a smart phone. This terminal is used to manage the user's subscriptions. In other words, rather than centralizing the transmission of the messages in a server, such as the intermediate server, this management of subscriptions is taken charge of by an application at the terminal upon communication of subscriptions by the server. During the first execution of the application on the terminal, a secured line is created between the terminal and the server. The application uses an identifier (the same one as the one given by the user when entering payment information for subscription to the good or to the service, or for example the email address or a telephone number or both) for the unique identification of the user. Once this identification is done, the server sends the user's terminal data enabling identification of the recurring transactions associated with this user (vendor, amount, timeline of previous debit operations and dates of these debit operations, type of message chosen). On the basis of this data, the application implements the following steps:
- computing the deadlines for advance notice as a function of the dates and a deadline for advance notice defined by the user;
- activating the display of a notification on the user's terminal when a deadline for advance notice takes place with the display of the type of message (tacit acceptance or tacit rejection);
- transactional processing when at least one of the following events occurs:
  - an action is performed by the user to tacitly accept or reject the transaction (depending on the type of message);
  - the deadline for responding to the message is exceeded.

In this example, the transaction is of course not processed by the user's terminal. The transactional processing done by the terminal is limited to the transmission of a message addressed to the server which will itself process this transaction.

Regularly, the application installed on the terminal performs operations for updating recurring transactions in setting up secure transactions with the server. In this embodiment the implementing of the proposed technique is therefore appreciably similar except that the user has all the data needed for the computations available in his terminal.

5.3. Intermediate Server

Referring to FIG. 2, we describe a device implemented to carry out the processing of recurring transactions according to the method described above. For example, the server comprises a memory 21 constituted by a buffer memory, a processing unit 22, equipped for example with a microprocessor and driven by the computer program 23, implementing a processing method.

At initialization, the code instructions of the computer program 23 are for example loaded into a memory and then executed by the processor of the processing unit 22. The processing unit 22 inputs one or more pieces of data representing instructions for processing recurring transactions. The microprocessor of the processing unit 22 implements the steps of the method according to the instructions of the computer program 23 to generate messages intended for users' terminals.

To this end, the device comprises, in addition to the buffer memory 21, communications means such as network communication modules, data transmission means and, as the case may be, an encryption processor.

These means can take the form of a particular processor implemented within the server, said processor being a secure processor. According to one particular embodiment, this server implements a particular application which is in charge of the computations.

These means also take the form of communications interfaces enabling the exchange of data on communications network, and means for interrogating and updating databases.

The device also comprises modules to implement the technique described. These are modules:
for transmitting an interrogation message of a given type, said message comprising at least one piece of identification data for identifying said recurring transaction, to a terminal of a user who has previously taken out a subscription to the good or to said service;
inserting said recurring transaction into a deferred processing database;
transactional processing according to the occurrence of one at least of the following events:
reception of a message coming from said terminal of said user;
expiry of the deadline for carrying out the recurring transaction.

These modules can take the form of software or hardware modules (such as for example programmable electronic components). These modules can also comprise functions for implementing other steps of the methods described here above. More specifically, specific methods can be responsible for implementing computations of advance payment deadlines enabling the transmission to a user's terminal, of a message to the user.

The invention claimed is:

1. Method for processing a recurring transaction for access to a good or to a service, the method being implemented within a processing server connected to a terminal of a user, the method comprising an initial obtaining, by said processing server, of a piece of data representing a processing instruction for processing the recurring transaction, wherein the method comprises:
a secured processor of said processing server inserting said recurring transaction into a deferred processing database, together with a message type and a deadline for implementing said transaction, said message type indicating either tacit acceptance of the recurrinq transaction or tacit rejection of the recurring transaction;
the secured processor of said processing server computing a probable due date of said transaction as a function of a transactional profile of said user of said terminal or of a provider of said good or said service;
the secured processor of said processing server computing an advance deadline by anticipating said probable due date by a pre-determined number of days;
the secured processor of said processing server transmitting, through a communication interface, at said advance deadline, a message to the terminal of the user having previously subscribed for said good or said service, said message comprising at least one piece of identification data for identifying said recurring transaction, and corresponding to said message type; and
the secured processor of said processing server triggering, after an expiry of a deadline for the user to respond to said message and before said probable due date, a notification to said provider of said good or service that said recurring transaction is rejected by the user if said message type indicates tacit rejection of the recurring transaction in order to cancel the access to the good or the service, or a confirmation transmitted to the terminal of the user of a performance of the recurring transaction if said message type indicates tacit acceptance of said recurring transaction, and a recording of said rejection of, or said performance of, the recurring transaction in a database of said processing server.

2. The method according to claim 1, wherein said recurring transaction is a financial transaction.

3. The method according to claim 1, wherein a prior subscription to said good or said service has been performed online by using a bankcard.

4. The method according to claim 1, wherein computing a probable due date of said transaction comprises:
identifying, within a database, transactions coming from a provider of said good or said service of an identical amount in order to determine their periodicity.

5. A processing server for processing a recurring transaction for access to a good or to a service comprising means for obtaining a piece of data representing an instruction for processing the recurring transaction, the processing server being connected to a terminal of a user and comprising a secured processor for:
inserting said recurring transaction into a deferred processing database, together with a message type and a deadline for implementing said transaction, said message type indicating either tacit acceptance of the recurring transaction or tacit rejection of the recurring transaction;
computing a probable due date of said transaction as a function of a transactional profile of said user of said terminal or of a provider of said good or said service;
computing an advance deadline by anticipating said probable due date by a pre-determined number of days;
transmitting through a communication interface, at said advance deadline, a message to the user of the terminal who has previously subscribed for said good or said service said message comprising at least one piece of identification data for identifying said recurring transaction and corresponding to said message type; and
triggering, after an expiry of a deadline for the user to respond to said message and before said probable due date, a notification to said provider of said good or said service that said recurring transaction is rejected by the user if said message type indicates tacit rejection of the recurring transaction in order to cancel the access to the good or the service, or a confirmation transmitted to the terminal of the user of a performance of the recurring transaction if said message type indicates tacit acceptance of said recurring transaction, and a recording of said rejection of, or said performance of, the recurring transaction in a database of said processing server.

6. A non-transitory computer-readable medium comprising program code instructions stored thereon to perform a method of processing a recurring transaction for access to a good or to a service when the program is executed by a secured processor, wherein the method comprises:
- the secured processor inserting said recurring transaction into a deferred processing database together with a message type and a deadline for implementing said transaction, said message type indicating either tacit acceptance of the recurring transaction or tacit rejection of the recurring transaction;
- the secured processor computing a probable due date of said transaction as a function of a transactional profile of a user of a terminal or of a provider of a good or service;
- the secured processor computing an advance deadline by anticipating said probable due date by a pre-determined number of days;
- the secured processor transmitting, through a communication interface, at said advance deadline, a message to the terminal of the user having previously subscribed for said good or said service, said message comprising at least one piece of identification data for identifying said recurring transaction, and corresponding to said message type; and
- the secured processor triggering, after an expiry of a deadline for the user to respond to said message and before said probable due date, a notification to said provider of said good or service that said recurring transaction is rejected by the user if said message type indicates tacit rejection of the recurring transaction in order to cancel the access to the good or the service, or a confirmation transmitted to the terminal of the user of a performance of the recurring transaction if said message type indicates tacit acceptance of said recurring transaction, and a recording of said rejection in a database.

* * * * *